United States Patent
Dinello et al.

(10) Patent No.: US 7,034,672 B2
(45) Date of Patent: Apr. 25, 2006

(54) TIRE SENSOR

(75) Inventors: Panfilo M. Dinello, Clinton Township, MI (US); Robin L. Pointer, St. Clair Shores, MI (US)

(73) Assignee: Global Tech International, Inc., Clinton Township, MI (US)

( * ) Notice: Subject to any disclaimer, the term of this patent is extended or adjusted under 35 U.S.C. 154(b) by 0 days.

(21) Appl. No.: 10/481,100

(22) PCT Filed: Jun. 25, 2002

(86) PCT No.: PCT/US02/20531

§ 371 (c)(1),
(2), (4) Date: Dec. 17, 2003

(87) PCT Pub. No.: WO03/000509

PCT Pub. Date: Jan. 3, 2003

(65) Prior Publication Data

US 2004/0212486 A1   Oct. 28, 2004

Related U.S. Application Data

(60) Provisional application No. 60/300,874, filed on Jun. 25, 2001.

(51) Int. Cl.
*B60C 23/00* (2006.01)

(52) U.S. Cl. .................... 340/447; 340/445; 340/442; 73/146.5

(58) Field of Classification Search ............... 340/447, 340/442, 445, 446, 448, 443, 444; 73/146.4, 73/146.5; 116/34 R, 34 B; 152/152.1
See application file for complete search history.

(56) References Cited

U.S. PATENT DOCUMENTS

| | | |
|---|---|---|
| 4,160,234 A | 7/1979 | Karbo et al. |
| 4,319,220 A * | 3/1982 | Pappas et al. ............... 340/447 |
| 4,507,956 A | 4/1985 | Schlesinger et al. |
| 4,890,090 A | 12/1989 | Ballyns |
| 5,218,861 A | 6/1993 | Brown et al. |
| 5,442,369 A | 8/1995 | Van Voorhies et al. |
| 5,541,574 A | 7/1996 | Lowe et al. |
| 5,559,484 A * | 9/1996 | Nowicki et al. ............ 340/447 |
| 5,654,723 A | 8/1997 | Craven et al. |
| 5,717,135 A | 2/1998 | Fiorletta et al. |
| 5,734,353 A | 3/1998 | Van Voorhies |
| 5,889,464 A * | 3/1999 | Huang ........................ 340/442 |
| 6,278,361 B1 | 8/2001 | Magiawala et al. |
| 6,278,363 B1* | 8/2001 | Bezek et al. ................. 340/442 |
| 6,314,791 B1 | 11/2001 | Rapp et al. |
| 6,357,833 B1 | 3/2002 | Bajer |
| 6,378,360 B1 | 4/2002 | Bartels |
| 6,651,495 B1 | 11/2003 | Lonsdale et al. |

* cited by examiner

*Primary Examiner*—Anh V. La
(74) *Attorney, Agent, or Firm*—Cargill & Associates PLLC

(57) ABSTRACT

A tire monitoring device for monitoring various tire conditions of a tubeless tire mounted on a vehicle wheel having a recessed portion of the wheel and a wheel rim 5 defining the recessed portion, including a composite wheel having at least one wire free transmitter and a receiver incorporated into and embedded into the surface of the composite wheel in the recessed portions of the wheel. The transmitter and receiver will monitor, transmit and receive signals about the tire condition, including tire pressure and temperature. Also included is an embedded antenna permanently incorporated into the recessed portion of 10 the composite wheel, such that the antenna becomes a part of the wheel, with an antenna winding length of from about 0.5 to about 5.0 meters long. Other embodiments include the use of a toroidal antenna in the recessed portion of the wheel.

11 Claims, 3 Drawing Sheets

TIRE SENSOR

CROSS REFERENCES TO RELATED APPLICATIONS

This application is a 371 of PCT/US02/20531 filed on Jun. 25, 2002, which claims the benefit of U.S. Provisional Application No. 60/300,874 filed on Jun. 25, 2001.

BACKGROUND OF THE INVENTION

Recently, low tire pressure has become an issue in the news because many travelers have died from rollover accidents due to low tire pressure. Automakers have determined that it would be a safety initiative to have a dash read-out that would tell the driver of a vehicle when they have low tire pressure. Therefore, a new industry is coming forward to meet the demand of providing low pressure tire sensors to the automakers. In fact, in a white paper by Goodyear Tire & Rubber Company, and as published by the Society of Automotive Engineers, 250,000 accidents a year are a result of under-inflated tires. The cost in repairs due to accidents pales in comparison to the toll in human suffering due to injuries and even deaths that could possibly have been avoided had the driver been alerted of a potential tire problem.

Apart from the need to reduce the number of accidents and resulting injuries, there are major ecological implications for this technology. For instance, if a tire is under inflated by just 5 psi, it increases fuel consumption by 10%. Simplistically, in England alone, some 200,000 gallons of fuel per day could be conserved with proper tire pressure. This equals 73 million gallons per annum, a savings into the millions of dollars with considerable environmental benefits.

Many vehicles have had one or more tires deflate or go completely flat, sometimes even violently as in the case of a blowout while traveling. At times the driver is not immediately aware of the situation and may continue to drive on the remaining tires, dragging them on the pavement and causing them to become damaged as well. A blowout at high speeds can cause extensive damage if it goes undetected. The tire disintegrates and debris can damage the vehicle or other vehicles driving on the remnants of the now fragmented tire, steel belt, and bead wire. In the case of dual rear tires on a four-wheel axle, the size and subsequent louder noise and vibration experienced by the driver may cause this condition to go unnoticed, even resulting in the tire or even the vehicle catching fire.

Another concern about loss of tire pressure or low tire pressure is that it affects the load carrying capability, along with steering and breaking, affecting the overall control of the vehicle. This and the often disproportioned weight or center of gravity has lead to numerous roll-over accidents, resulting in an extensive loss of life, innumerable injuries, and devastating economic consequences for the drivers, passengers, insurance companies, vehicle manufacturers, and tire manufactures alike.

In an attempt to help to prevent further accidents of this nature, on Nov. 1, 2000, the United States Congress and former President Clinton passed and signed into law House Bill H.R. 5154 entitled the Transportation Recall Enhancement, Accountability, and Documentation ("TREAD") Act. Section 13 of this new law requires that within three years of the final rule making proceedings, every passenger car, multipurpose passenger vehicle, and truck with a gross vehicle weight rating of 10,000 pounds or less will be required to have a warning system installed in the vehicle to indicate to the operator when a tire is significantly under inflated. It is expected that other countries will follow suit.

Many inventors have been working on this problem long before legislation mandated an attempted solution. Various electronic devises are found in the art including several examples of tire pressure monitors and alarm systems. These are typically fastened to the rim of the wheel and required that a hole be drilled through the wheel, or a monitor device be strapped or banded to a wheel in order to detect changes in tire pressure or temperature and relay the information to a receiving devise that then alerts the driver.

Sensors based on Surface Acoustic Wave (SAW) technology have been preferred by the original equipment manufactures (OEM) due to the affordability and availability of materials that can be utilized to create a substrate that has the appropriate properties for sending mechanical, or acoustic waves as the sensing mechanism. These sensors utilize piezoelectric material to generate the acoustic wave by generating an oscillating electric field thereby creating a mechanical wave, which propagates through the substrate, and then is converted back to an electric field by way of a signal for measurement. The devise needs no batteries, thereby avoiding any disposal problems or battery failure during operations. SAW devises are highly sensitive, very economical, and very tiny. Many manufacturers of this type of sensor prefer the placement of the sensor itself behind the air valve of a tire, using the brass stem as an antenna for transmitting the signal.

In the prior art, there are several examples of tire pressure monitors and alarm systems. These are typically fastened to the rim of the wheel and require that a hole be drilled through the wheel or attached through some sort of banding. See U.S. Pat. No. 4,954,677 or Alberter, et al.; U.S. Pat. No. 4,894,639 of Schmierer; U.S. Pat. No. 4,866,982 of Gault; U.S. Pat. No. 4,768,375 of Echardt, et al.; U.S. Pat. No. 6,378,360 of Bartels; U.S. Pat. No. 6,278,361 of Magiawala; U.S. Pat. No. 5,717,135 of Fiorietta; and U.S. Pat. No. 4,784,993 of Lothar, et al. These systems include a transducer of some sort that converts the pressure to a signal for communicating the pressure to a remote display.

The disadvantage to this valve stem antenna design is that it requires some sort of modification of the wheel rim or valve stem, often requiring holes drilled in the wheel to receive the transducers, thereby causing undue stress on the wheel, retrofitting existing wheels, and raising legitimate safety concerns. Additionally, the attachments can vibrate loose causing sensitive instruments to fail transmitting their signal accurately to the monitor located in the cockpit of the vehicle.

The problem of connecting the transducer to a monitor has been solved in part by radio frequency communications. As shown in U.S. Pat. No. 4,890,090 of Ballyns, a pressure transducer is coupled to a radio frequency transmitter that is mounted within the tire and secured to the wheel rim. Although it has the advantage of wireless communication of the pressure to a remotely placed monitor, it suffers from the same disadvantages of the rim and valve stem mounted sensors in that they are difficult to install and may become easily damaged and thereby prove to be unreliable.

To avoid this communication problem, it is possible to indirectly monitor the condition of the tire using tire rotation sensors like those installed as original equipment on vehicles with anti-lock braking and some all-wheel drive systems. To detect a deflating tire, these sensors are monitored for abnormal changes in rotation speeds of the tire indicating deflation. Doing so requires sophisticated sensors, data processing equipment and algorithms, and a vehicle originally equipped with this advanced and expensive technology. Although it is a sophisticated approach, it is not feasible for most vehicles such as buses, trucks and motor homes currently being manufactured.

Despite previous substantial efforts to improve the safety of tires, current tire pressure monitoring systems continue to be expensive and elaborate; they require substantial modification to existing wheels and to the car for their use; and they offer methods having little to no feasibility for retrofitting the millions of ordinary wheels that are in use and will continue to be manufactured and used.

The current invention discloses several new approaches to monitoring tire pressure and temperature in tubeless tires. Either a new type of antenna may be used, or the entire package of the sensing device and the electronic circuitry, which includes the transmitter and an antenna, can be incorporated into a composite wheel rim during manufacturing. The sensor and subsequent electronics are in a sealed housing to protect the components from physical damage from flat tire lubricants, tire sealants, and the elements. The housing is embedded in the composite recessed rim portion of the wheel so as to be affected by the changes in pressure and temperature, without degrading the accuracy of the signal through the variations of vibration experienced by other sensor devises. The composite materials lend themselves well to conductivity and will in no way impede the RF signal sent by the SAW devise to the receiver.

A composite wheel is under development by several of the wheel manufacturers currently supplying original equipment to the automotive, truck, agricultural, utility, and RV markets. These wheels are stronger than conventional steel wheels, and much lighter. By significantly reducing the weight of the wheel, fuel economy is greatly enhanced. The lighter wheels are much easier to store, ship, mount, and manually handle than their steel counterparts. The cost of these composites is comparable as well with traditional steel wheels, but require less energy to produce.

The sensor devise itself may be one of many described herein and is not limited to the sensors listed, as this technology is rapidly developing and the most ideal sensing device has not yet been determined. Suitable sensors which may be incorporated herein by reference may include U.S. Pat. No. 4,954,677 of Alberter, et al.; U.S. Pat. No. 4,894,639 of Schmierer; U.S. Pat. No. 4,866,982 of Gault; U.S. Pat. No. 4,768,375 of Echardt, et al.; U.S. Pat. No. 6,378,360 of Bartels; U.S. Pat. No. 6,278,361 of Magiawala; U.S. Pat. No. 5,717,135 of Fiorietta; and U.S. Pat. No. 4,784,993 of Lothar, et al. Further disclosures that are also incorporated herein by reference are: European Pat. No. EP0518900 B1 of Lonsdale; U.S. Pat. No. 5,585,571 of Lonsdale; PCT/GB97/03028 of Lonsdale; British Pat. Nos. 9902341-8 of Perry; 9909652.1 of Transense; 9925873.3 of Transense; 99258736.3 of Transense; 9925538.2 of Lonsdale; GB9917579.6 of Transense; and 9915052.6 of Transense.

It would be advantageous if the antenna could also be embedded into the composite material of the wheel and wound around the hub of the wheel itself. A toroidal antenna, possibly helical in nature, may be permanently incorporated into the wheel during manufacturing. The preferred antenna is described in U.S. Pat. No. 5,734,353 of Van Voorhles, et al.; U.S. Pat. No. 5,442,369 of Van Voorhles, et al.; and U.S. Pat. No. 5,654,723 of Van Voorhles, et al., and is incorporated herein by reference as part of this work.

A particular benefit of this invention is that the sensor unit and circuitry embedded into the composite wheel, is not limited to tire sensors only. A vast array of sensing devises can be incorporated into the wheel that can communicate information about speed of the vehicle, footprint of the tire, accelerometers, breaking, steering, shock absorption, weight dispersion per axle or per tire, and considerably more information as can be relayed from tiny sensors that will interpret specific information into RF signals that will be translated into information transmitted to a monitor in the cockpit for the driver.

SUMMARY OF THE INVENTION

In accordance with the above advantages and objects, the present invention provides a new type of tire monitoring device for transmitting information about the tire pressure and temperature, among other conditions to the operator of the vehicle. In a first embodiment, there is at least a sensor including at least a wire free transmitter and a receiver for monitoring signals about the tire condition. The transmitter is used in conjunction with an antenna attached to or incorporated into the wheel rim for better operation conditions, and may also include a toroidal helically shaped antenna wrapped around the interior of the wheel in the recessed portion of the wheel rim. The antenna winding length may be from about 0.5 to about 5.0 meters long.

In another embodiment of the present invention, the wheel may be a composite wheel made of a composite material selected from the group consisting of graphite, plastics, double skinned reinforced foam-centered plastic composites, aluminum alloys, Kevlar reinforced plastics, and metal mesh reinforced plastics. The sensor can be incorporated into and embedded within the composite material, to become a part of the wheel rim, with only the top of the sensor being exposed to the interior of the tubeless tire, so that it may monitor the tire conditions. The antenna, whether linear or toroidal, may also be embedded into the composite wheel so that it is permanently incorporated into the wheel. Then, the monitoring device is assured of remaining with the vehicle, even though the tires may be removed, or if the wheel may be rotated.

These and other advantages, objects and aspects of the present invention are shown and illustrated in the accompanying drawings for the preferred embodiments and their modifications. A description of the preferred embodiments and the best mode of the present invention follows with reference to the drawings, in a manner so as to enable someone of ordinary skill in the art to practice the best mode of the invention, or its equivalents, without any undue experimentation on their part.

BRIEF DESCRIPTION OF THE DRAWINGS

In the following drawings which illustrate various embodiments of the present invention.

DETAILED DESCRIPTION OF THE DRAWINGS

Figure 1:
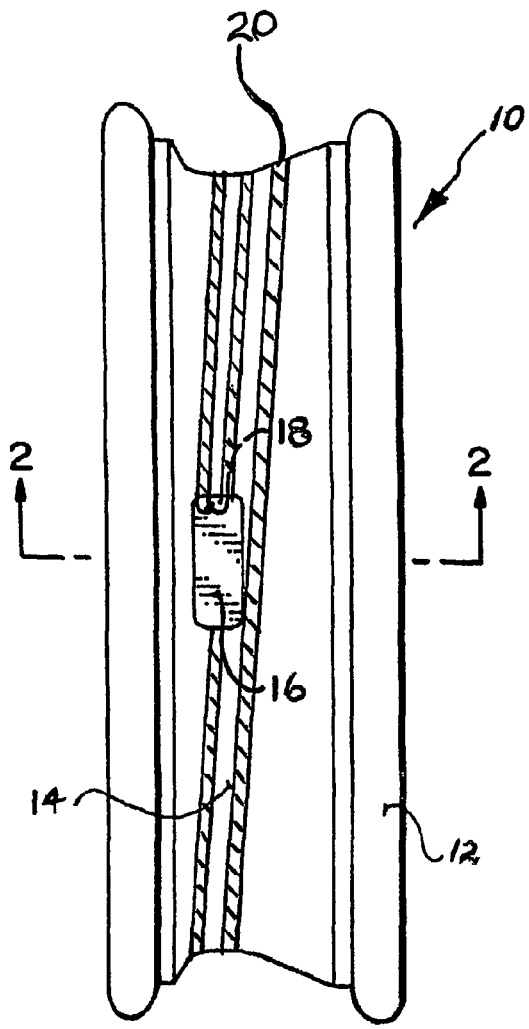
FIG. 1 is a side elevational view of a vehicle wheel with a tire temperature and/or pressure sensor having a wound around antenna in accordance with the present invention.

FIG. 1 shows the side of wheel rim having attached thereto the tire sensor and antenna configuration in accordance with the present invention. The entire tire sensing system is generally denoted by numeral 10, including the wheel rim 12 having a wheel rim cavity 14 for receiving the sensor housing 16 and the antenna attachment connector 18. Antenna 20 may be wound around the wheel rim, and acts to give a lengthy winding length of from about 0.5 to about 5 meters long. Antenna 20 may be adhered to the wheel rim with adhesives, or it may be embedded into a composite wheel. In the case of using a conventional steel wheel, antenna 20 may be a toroidal antenna having a diameter of from about 10 millimeters to about 5 centimeters, as disclosed in U.S. Pat. Nos. 5,734,353, 5,442,369 or 5,654,723, a winding length antenna, or any other suitable antenna for use which will not interfere with radio frequencies being emitted by cars which are located nearby. Wheel 12 may be made of steel or may be made of new composite materials which are formed of plastics, and which may include composite materials of graphite, various plastics, double skinned reinforced foam-centered plastic composites, aluminum alloys, Kevlor reinforced plastics, and metal mesh reinforced plastics. Other suitable composite materials known in the art may be utilized in the present invention.

Looking still at FIG. 1, it may be seen that one embodiment of the present invention includes a wound antenna attached to sensor housing 16 by antenna connector 18. Winding antenna 20 may be wound around the interior cavity of the wheel rim, and should be permanently attached, either with adhesives, or by embedding it into a coating on top of the steel rim, or in the case of composite wheels, the antenna may be incorporated directly into the composite wheel.

Figure 2:
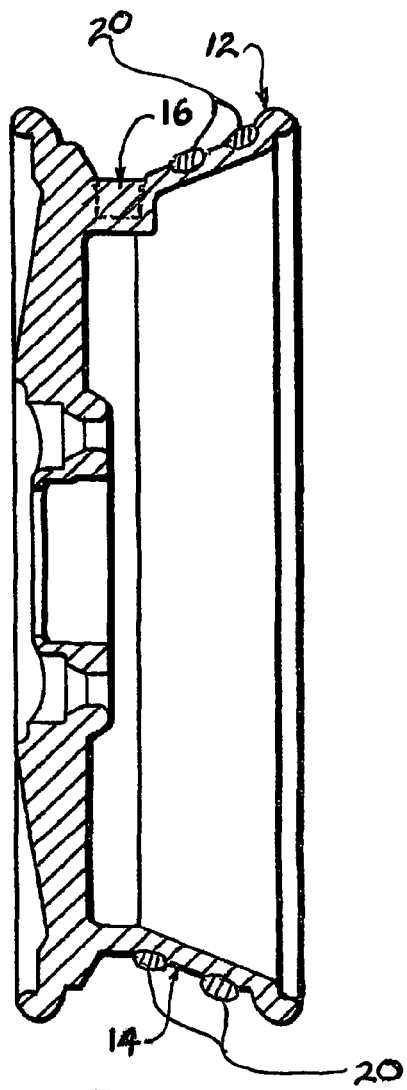
FIG. 2 is a cutaway view of a section of FIG. 1 illustrating the relative positions of the sensor and antenna.

Looking next to FIG. 2, which is taken along the cutaway lines 2—2 of FIG. 1, there is shown how the sensor housing 16 and antenna 20 may be embedded directly into the wheel rim cavity 14. This is accomplished during the manufacture of the composite wheel by placing the components into the mold and then introducing the plastic into the mold, thereby encapsulating and incorporating the sensor and the antenna directly into the wheel.

In the manufacture of steel wheels, sensor 16 may be placed within a cavity form in the steel wheel. The sensor (not shown in this figure) is held within sensor housing 16. Preferably, the surface of sensor housing 16 is open to the interior of the tubeless tire so that it may sense tire pressure and tire temperature. The sensor then will transmit and relay information to a receiver which can either be mounted within the wheel or within the body of the vehicle, i.e. in the underbody and/or the wheel well of the vehicle. The receiver may then be electrically wired and in electrical communication with a cockpit display which is located in the interior of the vehicle on the dashboard, such that the driver of the vehicle can view the information. Such cockpit displays are conventional in the art, and one may be selected without undue experimentation. The cockpit display may be a dashboard display in an automotive vehicle. A cockpit communicator may also be included in the tire sensing system of the present invention, and it may act as an intermediary between the receiver and the cockpit display. The communicator may be a microprocessor, or it may be a separate antenna and transmitter device. Although FIG. 2 illustrates antenna 20 being partial embedded, the present invention also envisions a complete submersion of the antenna within the body of the composite wheel, such that antenna 20 would only appear below the surface of wheel rim 12.

Figure 3:
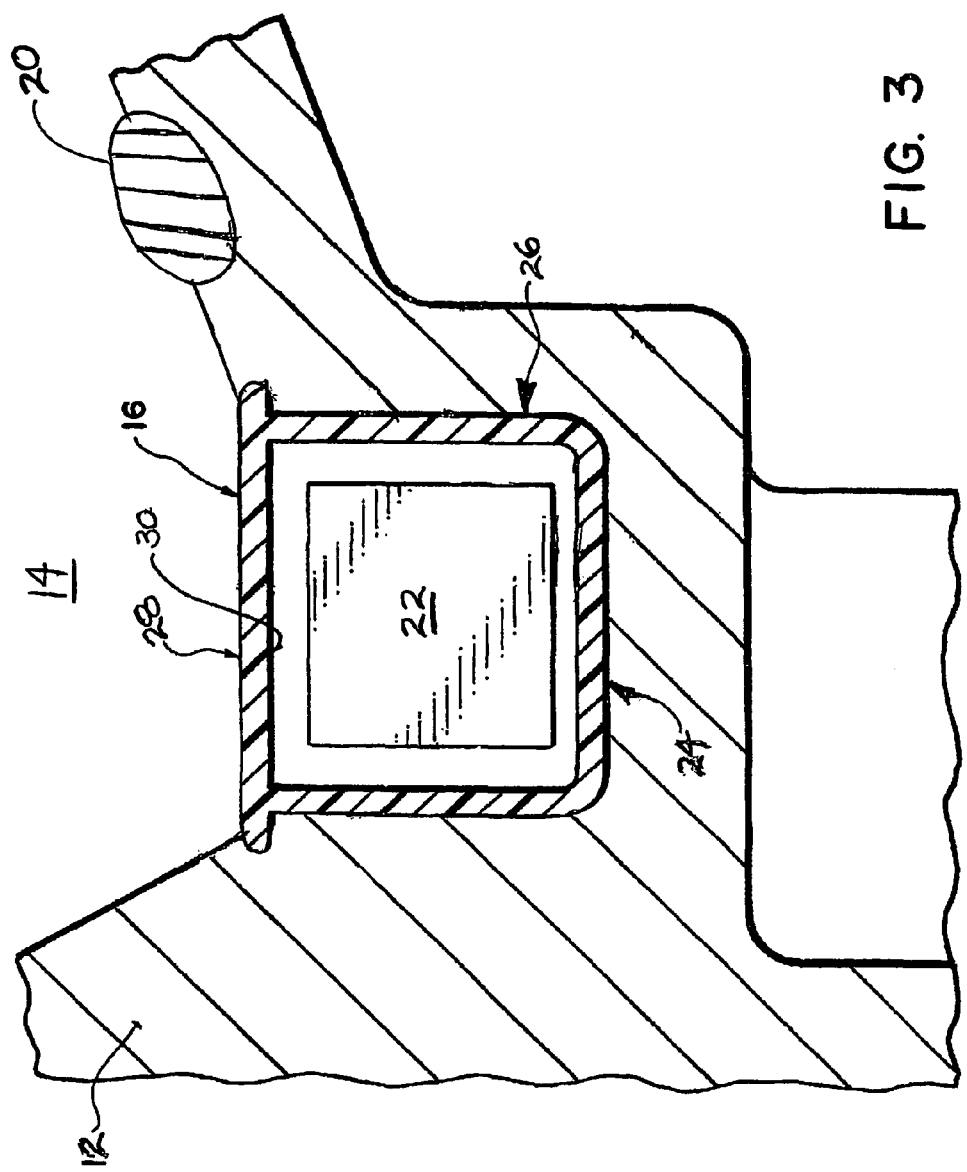
FIG. 3 a close-up sectional of an embedded sensor and an embedded antenna in an embodiment of the present invention disclosing the use of a composite vehicle wheel.

FIG. 3 shows a closer view of the embedded sensor housing 16 within wheel well 12. Antenna 20 is also shown partially embedded, although it may be fully embedded with wheel rim 12. Wheel rim cavity 14 has therein the sensor housing 16 embedded within wheel rim 12. A sensor seat 24 holds sensor 22 within place as well as sensor seat wall 26. Sensor housing upper surface 28 is in contact with the air pressure of the tubeless tire through the cavity 14. The underside of the sensing housing upper surface 30 is utilized to maintain the sensor 22 in its proper place. Again, the sensor housing 16 may either be incorporated right into the composite wheel while molding, or may be a separate piece which is inserted into the mold for receiving the sensor 22.

Figure 4:
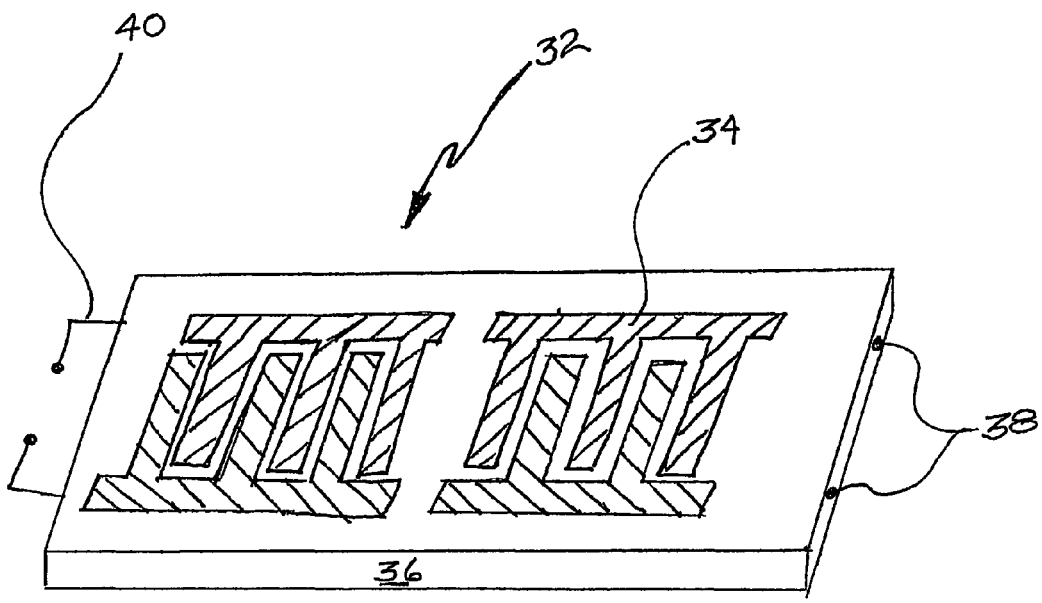
FIG. 4 is a top perspective view of a surface acoustical wavelength (SAW) transducer sensor useful in the present invention.

Looking next to FIG. 4, there is shown a sound acoustic wavelength (SAW) tire-sensing device in accordance with the present invention. The SAW sensor, generally denoted by numeral 32, includes interdigital transducers 34 adhered to the top of a piezoelectric substrate 36. Electrical output 38 is on one side of the device, while information input 40 is located on the other side. This SAW device is the preferred sensor to be used in the present invention, although many other sensors may be utilized, as described here and above in the background section. The sensor may be any standard sensor which is economical, and suitable for registering and transmitting information about tire pressure and tire temperature. Of course, many other conditions may need to be sensed, and applicable sensors for those conditions may be incorporated therein as well.

Figure 5:
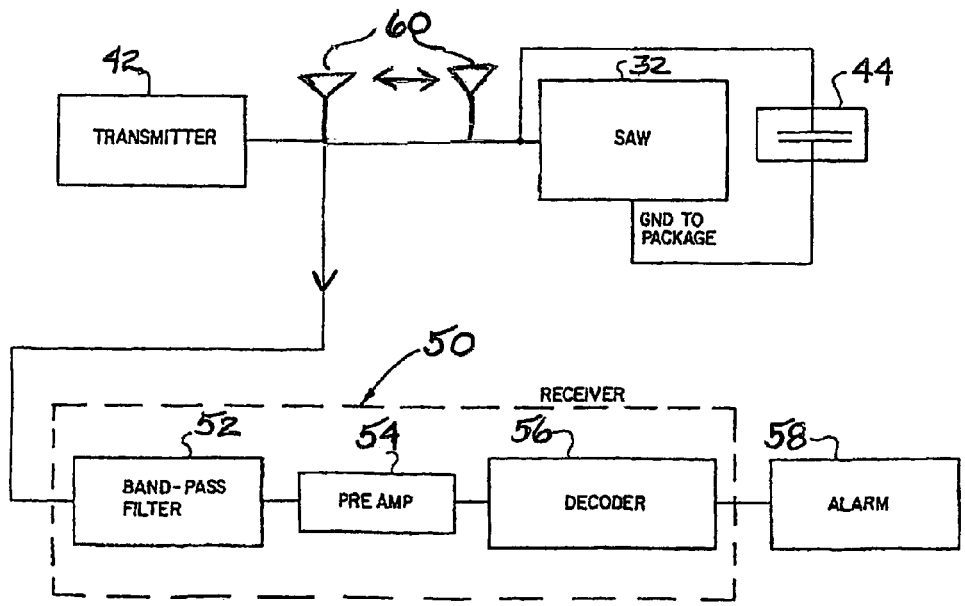
FIG. 5 is a schematic diagram of a tire condition monitoring device in accordance with the present invention.

FIG. 5 shows a signal processing circuit in accordance with the present invention, which may have several functions. As shown, the SAW device 32 may be in electrical communication with transmitter 42, either hard wired, or via antennas 60. A battery 44 is included which may be operated by a centrifugal switch, not shown, which may also be included to turn the system on or off when the vehicle is in motion, including switching off when the vehicle is stopped or switching into a sleep mode to extend the battery life. Within the SAW device, the tire monitoring system may include a temperature transducer and a pressure transducer which is shown above in FIG. 4. The receiver as generally denoted by numeral 50, will receive signals from transmitter 42, either electrically, or through radio waves, as are conventional in the art. The signals may be transmitted with wavelengths of between about 1 and 150 Hz. The sensor notes changes in frequency from about 20 to 30 Hz, and will send a danger signal.

A conventional receiver, as shown, would include a band-pass filter 52, a preamp 54 and a decoder 56. This receiver would then be able to send information signals to a cockpit display (not shown) or may be sent to an alarm 58 which would sound within the interior of the vehicle if one of the conditions became so low that the vehicle should not be operated. The alarm may be visual or audible, depending on the desires of the manufacturer.

This entire tire sensor signal processor may be an analog to digital converter to convert the analog signals from the transducers to digital signals. Furthermore, more conventional means, including an all analog system, may be utilized. Typically, however, microprocessors are the least expensive and most suitable means processing any digital outputs from the sensors to provide information regarding the temperature pressure, or any of the other conditions which may be wanted to be monitored including tire balancing, shock absorber condition, tread wear, wheel rotational speed, and other conditions which may be sensed.

Changes in the wavelength transmitted may trigger the alarm to be set off, or quantitive information may be relayed. Wavelength variations will change with different tires and vehicles.

As discussed above, receiver 50 may be located on the wheel, incorporated into the material of the wheel itself, incorporated into the underbody of the vehicle, or it may be located in or on the wheel well itself. If the underbody of the car is made of composite materials, the receiver may be able to be molded directly into a portion of the underbody. Furthermore, if the wheel wells are made by composites or dip molding, or any other plastic forming technology, then incorporation of the receiver into the wheel well is achievable. Battery 44 is preferably a lithium battery, and would most suitably include a housing which is virtually maintenance free. Battery life may be extended by the use of the centrifugal switch, in addition to the low voltage requirements of microprocessors and the SAW device itself. Alarm 58 may signal a low pressure or high temperature situation to the driver of the vehicle as disclosed above.

INDUSTRIAL APPLICABILITY

This invention finds industrial applicability in the field of tire condition and pressure monitoring systems for automotive vehicles, including cars and trucks. The present invention also finds industrial applicability in the fields of agricultural, utility and recreational vehicles, as well as in the aerospace industry.

What is claimed is:

1. A tire monitoring device for monitoring various tire conditions of a tubeless tire mounted on a vehicle wheel rotatably mounted on an axle of a vehicle, said vehicle having an underbody and wheel wells for housing the vehicle wheel, said wheel having a recessed portion of the wheel and a wheel rim defining the recessed portion, said tire monitoring device comprising:
    a composite wheel having a recessed portion of the wheel and a wheel rim defining the recessed portion suitable for supporting a tubeless tire mounted thereon, wherein said composite wheel is made from a material being selected from the group consisting of graphite, plastics, double skinned reinforced foam-center plastic composites, composite coated steel rim wheel, aluminum alloys, Kevlar reinforced plastics and metal mesh reinforced plastics;
    at least a wire free transmitter and a receiver for monitoring signals about the tire condition having a wavelength of from about 1 to about 150 Hz;
    a toroidal antenna permanently incorporated into the recessed portion of the wheel rim, such that the antenna relays information about the tire, and wherein the antenna is embedded into the composite wheel such that the antenna is permanently incorporated into the wheel, not requiring any further assembly.

2. The monitoring device of claim 1, wherein the transmitter includes a surface acoustic wavelength sensor for transmitting information about the tire pressure and temperature to the operator of the vehicle.

3. The monitoring device of claim 1, wherein the receiver is located in a remote location from the vehicle wheel itself, where the receiver is in a location selected from the group consisting of the vehicle underbody and the vehicle wheel well.

4. The monitoring device of claim 1, wherein the toroidal antenna is from about 10 millimeters to about 5 centimeters in diameter.

5. The monitoring device of claim 1, further comprising a cockpit display.

6. The monitoring device of claim 1, further comprising a cockpit communicator.

7. A tire monitoring device for monitoring various tire conditions of a tubeless tire mounted on a vehicle wheel rotatably mounted on an axle of a vehicle, said vehicle having an underbody and wheel wells for housing the vehicle wheel, said wheel having a recessed portion of the wheel and a wheel rim defining the recessed portion, said tire monitoring device comprising:
    a composite wheel having a recessed portion of the wheel and a wheel rim defining the recessed portion suitable for supporting a tubeless tire mounted thereon wherein said composite wheel is made from a material being selected from the group consisting of graphite, plastics, double skinned reinforced foam-center plastic composites, composite coated steel rim wheels, aluminum alloys, Kevlar reinforced plastics and metal mesh reinforced plastics:
    at least one wire free transmitter and a receiver incorporated into and embedded into the surface of the composite wheel in the recessed portions of the wheel such that the transmitter and receiver are both permanently embedded into the composite wheel, and said transmitter and receiver are both adapted for monitoring, transmitting and receiving signals about the tire condition, said transmitter transmitting signals having a wavelength of from about 1 to about 150 Hz;
    an embedded antenna permanently incorporated into the recessed portion of the composite wheel, such that the antenna becomes a part of the wheel, with an antenna winding length of from about 0.5 to about 5.0 meters long.

8. The monitoring device of claim 7, wherein the at least one wireless transmitter transmits signals with information regarding the tire pressure and tire temperature to the operator of the vehicle.

9. The monitoring device of claim 7, wherein the receiver is attached remote to the location of the wheel, in a location selected from the group consisting of the vehicle underbody and the wheel well.

10. The monitoring device of claim 7, further comprising a cockpit display.

11. The monitoring device of claim 7, further comprising a cockpit communicator.

* * * * *

UNITED STATES PATENT AND TRADEMARK OFFICE
CERTIFICATE OF CORRECTION

PATENT NO. : 7,034,672 B2  Page 1 of 1
APPLICATION NO. : 10/481100
DATED : April 25, 2006
INVENTOR(S) : Dinello et al.

It is certified that error appears in the above-identified patent and that said Letters Patent is hereby corrected as shown below:

On Title Page, Item (73) col. 1

Assignee: Global Tech International, Inc. (Clinton Township, MI)

Should Read,

Assignee: Advanced Digital Components, Inc. (Troy, MI)

Signed and Sealed this

First Day of August, 2006

JON W. DUDAS
*Director of the United States Patent and Trademark Office*